United States Patent [19]

Kovacs

[11] 4,149,492

[45] Apr. 17, 1979

[54] REMOTE RELEASE LEASH

[76] Inventor: Gabor Kovacs, 3601 Ivy, East Chicago, Ill. 46312

[21] Appl. No.: 770,778

[22] Filed: Feb. 22, 1977

[51] Int. Cl.$^2$ ............................................. A01K 27/00
[52] U.S. Cl. .................................................. 119/111
[58] Field of Search ........ 119/106, 109, 110, 111–116, 119/151, 153; 294/110; 54/69

[56] References Cited

U.S. PATENT DOCUMENTS

| | | | |
|---|---|---|---|
| 2,155,913 | 4/1939 | Thompson et al. | 294/110 A |
| 3,910,234 | 10/1975 | Henson | 119/111 |
| 3,949,514 | 4/1976 | Ramsey | 119/153 X |

Primary Examiner—Russell R. Kinsey
Assistant Examiner—Robert P. Swiatek
Attorney, Agent, or Firm—Leydig, Voit, Osann, Mayer & Hold, Ltd.

[57] ABSTRACT

A remote release leash for a dog collar including a hand held actuator at one end, a latch at the other end, and a tube joining the actuator and latch. The latch includes a bolt, spring biased to the closed position. The actuator includes a plunger spring biased to the released position. A wire running through the tube joins the plunger to the bolt. A button in the actuator holds the plunger in the armed position, allowing the spring biased bolt to remain closed. Depression of the button releases the plunger for rearward translation, thereby to draw on the wire and pull the bolt open to release the dog. The independent biasing of the actuator and the latch allows multiple dog operation wherein a single actuator may control two or more latches. Furthermore, a transition piece may be provided to allow a single actuator to be used with any of a series of single, multiple, or elongated latching elements.

7 Claims, 11 Drawing Figures

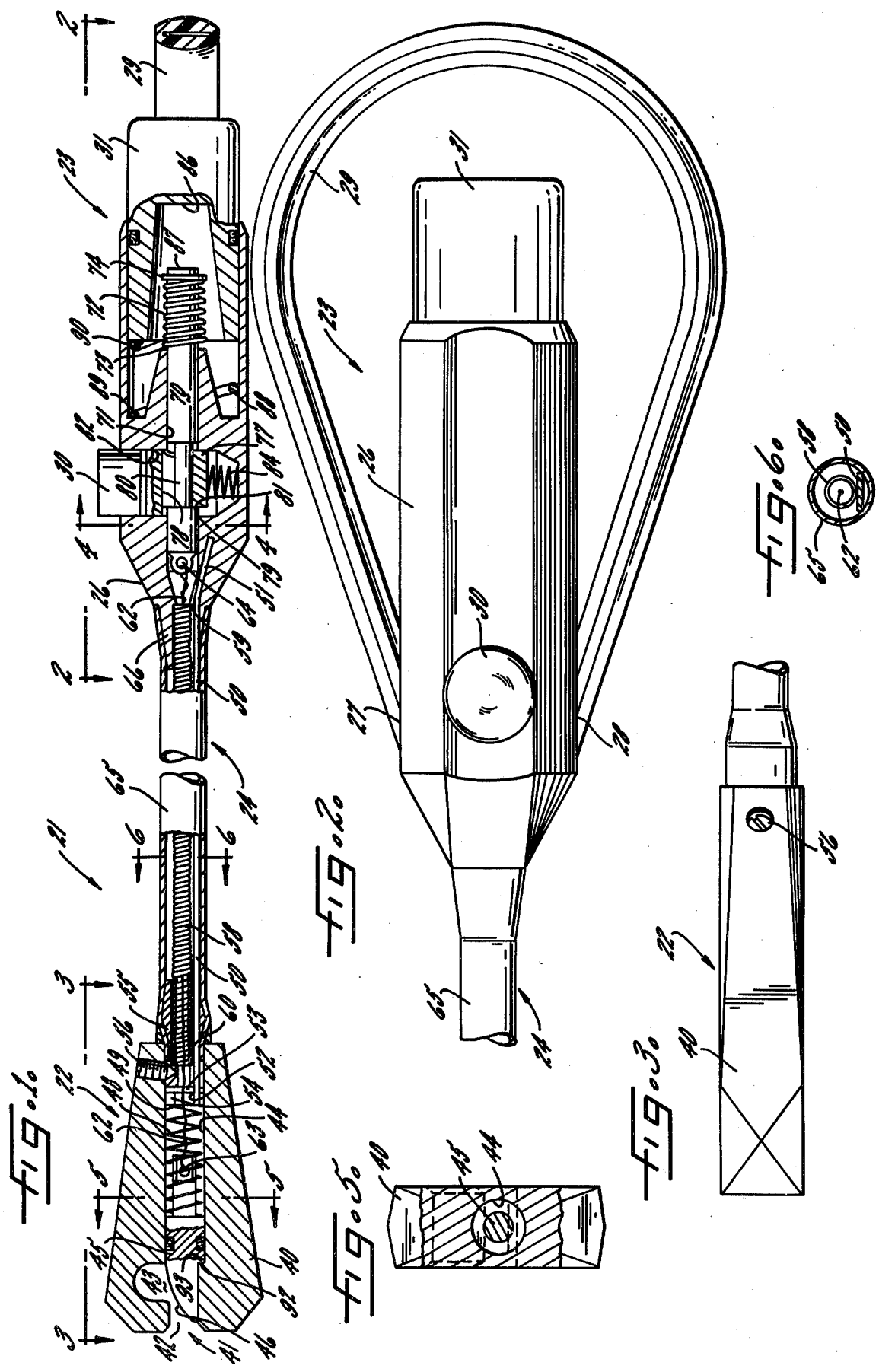

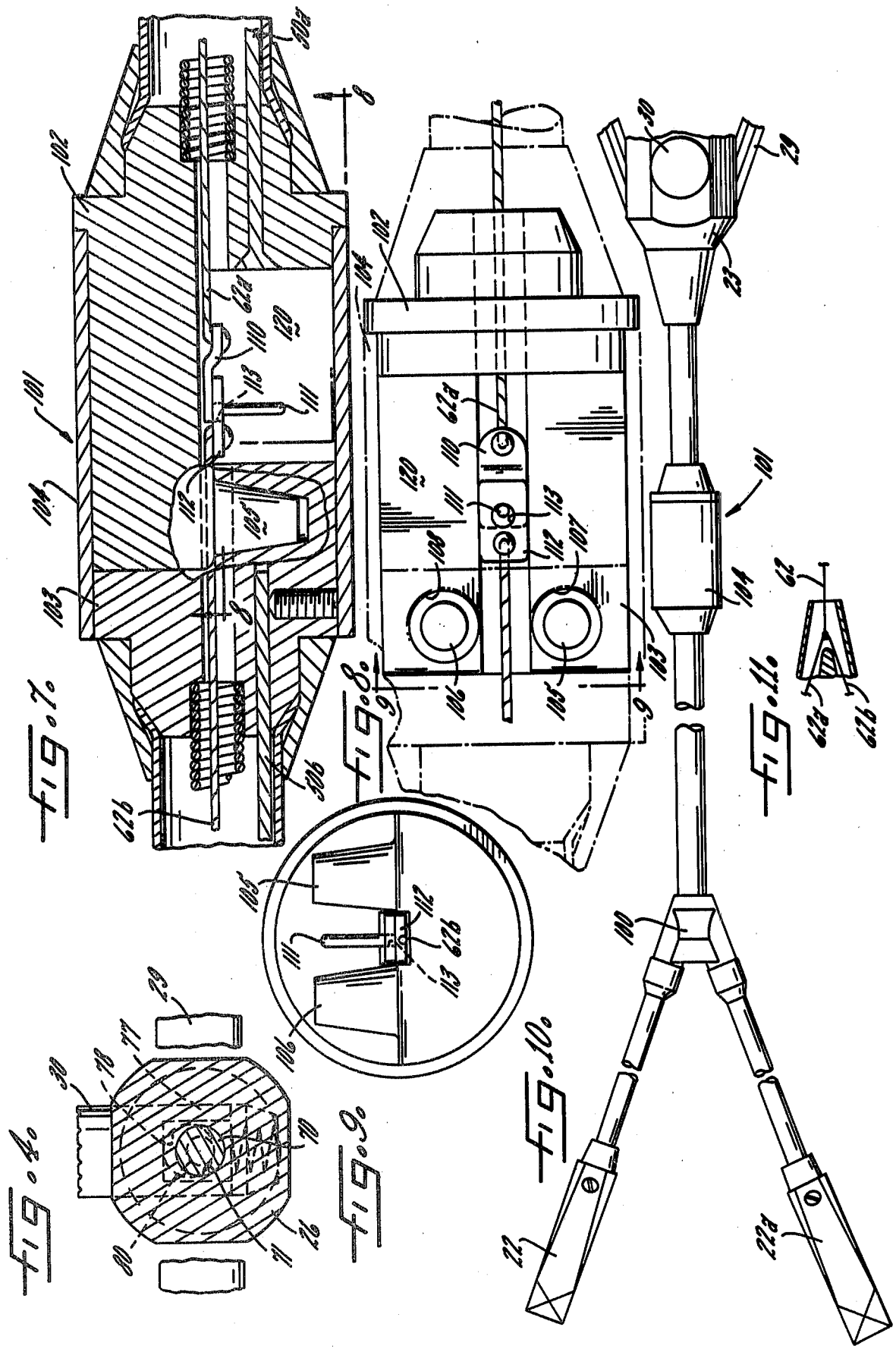

REMOTE RELEASE LEASH

This invention relates to dog leashes, and more particularly to those of the quick release type for remotely freeing the leashed animal.

Remote release leashes, that is those intended to unleash the animal without direct access to the connection between the leash and collar find a variety of uses. One important use is in connection with guard dogs and the like, used by the military and police forces, where the dogs are kept leashed until danger is encountered whereupon they are released. In such situations, it is essential that the dog be released quickly, with minimum effort on the part of the handler, and that the release mechanism operate reliably, even with the animal straining at the leash. The prior art has met with only limited success in achieving these combined goals. For example Henson U.S. Pat. No. 3,910,234 shows a quick release dog leash having a spring loaded locking member, but requires the operator to manually oppose the spring force to effect a release, and to continue the application of such force for so long as the leash is to remain unlatched. The Henson leash uses a straight line motion in the latching member, but does so in a way which apparently will result in a binding moment on the latching member if the dog is straining at the leash. A further drawback resides in the fact that the actuator ring must be manipulated when leashing the dog.

Another prior art approach is shown in Barhorst U.S. Pat. No. 2,821,169 which requires a pivotable latching member, believed to be less desirable than a straight line operating latch. Furthermore, the quick release mechanism is only operable with the leash in the completely taut position.

U.S. Pat. No. 3,099,250 to Soles shows another approach requiring a rigid connecting tube between a handle and the latching member and a pivoting linkage connected by a rigid rod to a released actuator. Finally, Clayton U.S. Pat. No. 3,074,378 shows a quick release collar which requires access not only to the leash, but also to a separate line 64 in order to operate the mechanism.

In view of the foregoing, it is a general aim of the present invention to provide a remote release leash operable by simple manual manipulation of a trigger which effects opening of a latching member in a reliable manner.

In accomplishing that aim, it is an object of the present invention to provide a remote release leash having a spring loaded latch and a spring loaded actuator, the actuator, when triggered, serving to open the latch against its biasing force. In that regard, it is a more detailed object to provide an actuator, easily operable, as by a button push.

According to another aspect of the invention, it is an object to provide a reliable remote release device, relying on simple linear motion of the moving parts, and providing a latching member which will not bind when subjected to external forces, such as those imposed by an animal straining at the leash.

Finally, an object of the present invention is to provide a remote release leash wherein a single actuator may operate a plurality of latches for controlling a number of dogs.

Other objects and advantages will become apparent from the following detailed description, when taken in conjunction with the drawing, in which:

FIG. 1 shows a remote release leash constructed in accordance with the present invention, partly in section;

FIG. 2 is a plan view of the actuator portion taken along the lines 2—2 of FIG. 1;

FIG. 3 is a plan view of the latch mechanism taken along the lines 3—3 of FIG. 1;

FIG. 4 is a sectional view showing the trigger mechanism, taken along the lines 4—4 of FIG. 1;

FIG. 5 is a sectional view showing the jaw and bolt taken along the lines 5—5 of FIG. 1;

FIG. 6 is a sectional view of the connecting cable taken along the lines 6—6 of FIG. 1;

FIG. 7 is a sectional view of a transition piece, illustrating a modification of the preferred embodiment for interconnecting a separate actuator and latch;

FIG. 8 is a sectional view of the transition piece taken along the lines 8—8 of FIG. 7;

FIG. 9 is a partial view showing the interfitting elements of the transition piece, taken along the lines 9—9 of FIG. 8;

FIG. 10 is a plan view showing a modification of the preferred embodiment including the aforementioned transition piece and two latching members; and FIG. 11 is a partial sectional view showing the junction of the operating wires of the two dog leash of FIG. 10.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Turning now to the drawings, FIG. 1 shows a remote release leash generally indicated at 21 including a latch 22, an actuator 23 and a connector 24, tubular in nature, joining the latch and actuator. Referring to FIG. 2, it is seen that the body 26 of the actuator 23 is generally cylindrical in shape, forming a handle. Attached to the handle at 27, 28 is a strap 29 which encircles the wrist of a user while the handle is held in his hand. Atop the handle is a pushbutton 30, readily accessible to the thumb of the handler, for operating the actuator to release the latch. Finally, there is shown a cocking member at 31, in the nature of a cylindrical button displaceable into the handle to arm the actuator.

As shown in FIGS. 1, 3 and 5 the latch 22 includes a body member 40, preferably metallic, having an opening 41 at the forward end comprising an entrance 42 and a pocket 43. The body 40 has a bore 44 projecting through the other end for receiving a bolt 45. The bolt 45 is reciprocatable in the bore 44, and includes a rounded nose portion 46, which in the position illustrated in FIG. 1, projects into the entrance to close the latch. When the bolt 45 is withdrawn into the bore 44 (toward the actuator) the entrance 42 is correspondingly opened. A spring 48 resting against a fixed supporting surface 49 in the bore 44 urges the bolt 45 into the closed position.

Referring now to the connecting means 24, there is shown a wire or band 50 serving to join the actuator 23 to the latch 22, being secured at 51 in the forward portion of the handle 26, and soldered or welded at 52 to an adapter 53 in the latch. Abutted on the adapter 53 is a distance ring 54 for supporting the spring 48. The distance ring and adapter are held in place by a fitting 55 secured in the jaw by a set screw 56. Preferably, the wire or band 50 is somewhat flexible, so as to impart limited flexibility to the connecting section of the leash.

The connecting means 24 also includes a guide tube 58, of coiled metal or the like, held in the handle 26 at 59, and abutted on the adapter 55 at 60. Threaded through the guide tube 58 is a strong wire 62, of stainless steel or the like, secured at one end to an aperture 63 in the bolt 45, and at the other end to an eye 64 in the actuator. These elements are encircled by a tube 65, preferably of plastic, which serves to protect the elements and to enhance the appearance of the device. The tube 65 mates the adapter 55 at the latch end, and fits on a tapered section 66 of the handle 26 at the other end.

Attention will now be focused on the actuator mechanism itself, best shown in FIG. 1. The actuator includes a plunger 70 mounted for reciprocation in a bore 71 in the handle. A spring 72 biases the plunger toward the released position (to the right in FIG. 1) by virtue of the compression thereof between a land surface 73 of the handle and a disc 74 affixed to the rear portion of the plunger. The spring 72 is selected to exert a greater force on the plunger than that exerted by the spring 62 on the bolt 45. The button 30 operates a trigger mechanism which latches the plunger in the position illustrated in FIG. 1, but is capable of releasing it when depressed, for translation under control of the spring 72. The button 30 carries an extended portion 77 having a bore 78 of sufficient size to allow the plunger to pass therethrough. The forward face of the extension provides a detent surface at 79 which cooperates with a relieved portion 80 on the plunger, allowing the detent surface 79 to engage a forward face 81 of the relieved portion for latching the plunger in the armed condition. The button fits in a recess 82 in the handle so that it may be depressed to allow the detent surface 79 to fall free of the relieved portion 80 of the plunger, allowing the plunger to move sharply to the right under the urging of the spring 72. The interrelationship of the bore 78 and the relieved portion 80 of the plunger is illustrated in FIG. 4, which shows the elements in the armed condition. A spring 84 is positioned below the button 30 to urge the same upward for automatically locking the plunger when it is returned to the armed position.

As noted above the handle 26 includes an arming member 31, such arming member having an internal floor 86 for engaging the head 87 of the plunger when the plunger is in its released condition. As illustrated, the arming mechanism 31 is reciprocatable into the handle so that the floor 86 carries the plunger forward, ultimately allowing the spring 84 to raise the button 30 to lock the mechanism in the armed condition. A spring 88 interposed between a surface 89 of the handle, and a further surace 90 of the arming button biases the button to the extended condition.

In operation, the mechanism is armed simply by depressing the arming member 31 into the handle, whereupon the spring 84 causes the button to rise when the relieved portion 80 of the plunger reaches the appropriate spot, to engage the detent surfaces, thereby locking the mechanism in the armed condition. In this condition, the independent spring biased force of the latch member causes the bolt 45 to move to its forward position, thereby closing the entrance, leaving the latch in the locked condition. It is seen that the bolt 45 has a shoulder at 92, engaging a ridge 93 in the latch, to set a forward stop for the bolt. In the armed condition, the leash may then be attached to the collar of a dog, typically to a ring provided for that purpose. By virtue of the fact that the spring members in the actuator and latch are independent, the dog may be leashed with the leash in the armed condition, forcing of the ring through the entrance causing the bolt 45 to move rearwardly, allowing the ring to enter the pocket 43, whereupon the bolt returns to the forward locked position. It is seen that with this arrangement, even if the dog strains at the leash, the forces applied to the bolt do not produce a binding torque. When it is desired to release the dog, the pushbutton 30 is simply depressed, allowing the plunger 70 to move sharply to the rear, thereby drawing the wire 62 through the tube 58, and moving the bolt 45 to the rearward released position. The leash will remain in this condition until re-armed.

It will be appreciated that reliability of the device is enhanced by virtue of the linear action in both the actuator and the latch, eliminating the need for pivots and the like which increase complexity, reduce reliability, and further expand the size of the device. Furthermore, by virtue of the independent springs in both the latch and the actuator, the handler need give no attention to the actuator when attaching the leash to the device, simply arming the leash before attachment, and manually deflecting the bolt when attaching it to the dog collar. The spring loaded trigger thus provided is actuated by a simple instantaneous depression of a pushbutton, requiring no effort on the part of the handler to maintain the latch open until the dog is free. In other words, once triggered, the latch is opened and remains so until re-armed.

A further advantage of this structure is demonstrated in the modification illustrated in FIG. 10 wherein a pair of latches 22, 22a are operated by a single actuator 23. Because the latches 22, 22a are independently locked by virtue of their individual biasing springs, the tolerances of the elements connecting the pair of latches to the single actuator can be realized in a practical situation. All that is necessary, is that the actuator provide sufficient rearward movement to open both latches and that the actuator spring be stronger than the combined latch springs. As shown in FIG. 11, the main actuator wire 62 is joined to the individual actuator wires 62a, 62b of the respective latches as by welding or soldering, so that rearward movement of the actuator wire 62 draws the bolts of both latches rearwardly. The junction of the wires is accomplished in the fitting indicated generally at 100.

A further modification, also made possible in part by the independent spring actuation of the respective ends of the leash, is illustrated in FIG. 10 as the transition piece 101. As will become more apparent, the transition piece 101 allows the actuator end of the leash to be disconnected from the latch end, providing a "leash system" of unusual flexibility. More specifically, allowing the actuator and latch ends to be individually manufactured, and joined by a transition piece would allow a user to purchase a single actuator with multiple latching arrangements. Thus, the single actuator could be used with a double leash as illustrated in FIG. 10, a single leash as illustrated in FIG. 1, or with leash extensions for providing greater length. The transition member 101 is illustrated in greater detail in FIGS. 7—9. In this embodiment, the connecting wire or strip 50 is formed in two sections, a first section 50a being secured in an "actuator end" locking block 102, and the second end 50a being secured in a "latch end" locking block 103. A cylindrical sleeve 104 encircles the locking blocks to hold them in the assembled condition. In order to release the device, the sleeve 104 is moved to the left in FIG. 7 allowing the locking blocks 102, 103 to be separated. It is seen that the locking block 102 carries a pair of conical projections 105, 106 which fit within a pair of conical recesses 107, 108 in the locking block 103, thereby to securely maintain the two locking pieces in assembled condition. The operating wire 62 is also segmented to provide an actuator end 62a and a latch end 62b. It is seen that the actuator end wire 62a is secured by welding or the like to a bracket 110 carrying a depending pin 111. The latch end wire 62b is similarly joined to a bracket 112 having an aperture 113 for receiving the pin 111. Thus, to assemble the transition piece, the pin 111 is inserted through the aperture 113, following which the projections 105, 106 of the locking member 102 are fitted in the apertures 107, 108 of the locking piece 103. Thereupon the sleeve 104 is slid over the entire assembly to provide the necessary integrity between the selected latch member and the actuator. The transition piece provides a cavity 120 in the area of the junction of the wire 62a, 62b, the cavity being of sufficient size to allow movement of the pin 111 for the full travel of the wire 62 from the armed to the released positions.

It will now be appreciated that what has been provided is an improved remote release leash which is both simple to operate and highly reliable in nature.

I claim as my invention:

1. A remote release leash for a dog collar comprising, a latch, a hand held actuator, and connecting means including a tube joining said latch to said actuator, said latch including a body fixed to the connecting means, a pocket in said body for connection to the collar, a bolt reciprocatable in said body between a closed position for locking the collar and an open position for releasing said collar, and bolt spring means for biasing the bolt to the closed position, said actuator including a handle, a plunger within the handle and reciprocatable between a released and an armed position, actuator spring means biasing the plunger to the released position, button means in the handle arranged to engage the plunger to restrain same in the armed position, said button means being displaceable on depression thereof to release said plunger for spring biased translation to the released position, and operating wire means within said tube connecting said bolt to said plunger, said actuator spring means so constructed and arranged as to exert a greater force on said plunger than is exerted by the bolt spring means on said bolt so that release of said plunger for spring biased translation to the released position withdraws said bolt to the open position for releasing the dog collar.

2. The leash as set forth in claim 1 wherein said handle further includes a recess at the extremity thereof and a cocking member in said recess, said cocking member being arranged to engage the head of said plunger for translating same from the released to the armed position.

3. The leash as set forth in claim 1 wherein said button means includes an aperture sufficiently large to allow said plunger to pass therethrough, said plunger being arranged to project through said aperture, said button having a detent surface, said plunger having a relieved portion for engaging said detent surface to hold said plunger in the armed condition, said button means being displaceable to disengage said detent surface from said relieved portion to allow spring biased translation of said plunger.

4. The leash as set forth in claim 1 wherein said connecting means includes a connecting wire joining said latch to said actuator, a metallic tube encompassing said operating wire means, and a protective tube encompassing said connecting wire and said metallic tube.

5. The leash as set forth in claim 1 wherein said body includes an opening at one end thereof for receiving said collar, said opening including an entrance joining said pocket, an aperture projecting through the other end of said body for slidably receiving said bolt, said bolt having curved surfaces projecting into said aperture for closing said entrance and being manually deflectable to open said aperture for receiving a dog collar, and stop means in said body for limiting movement of said bolt to define the closed position of said latch.

6. The leash as set forth in claim 1 further including a transition member interposed between said latch and said actuator, said transition member including first and second interfitting members disengageable to release said latch from said actuator, said connecting means including said tube being segmented to provide respective ends, said ends being connected to the respective interfitting members, said operating wire means being segmented at said transition member, said transition member including means for joining the respective ends of said operating wire means and allowing translation thereof upon operation of said actuator.

7. The leash as set forth in claim 1 further including a second said latch, second operating wire means connected to the bolt of said second latch, and means joining said second operating wire means to said operating wire means so that operation of said actuator opens both latches.

* * * * *